(12) United States Patent
Murrish et al.

(10) Patent No.: US 11,828,367 B2
(45) Date of Patent: Nov. 28, 2023

(54) CONNECTING ROD CATCHER SLOT

(71) Applicants: GM GLOBAL TECHNOLOGY OPERATIONS LLC, Detroit, MI (US); AMERICAN AXLE & MANUFACTURING, INC., Detroit, MI (US)

(72) Inventors: Dale E. Murrish, Troy, MI (US); Steven Letourneau, White Lake, MI (US)

(73) Assignees: GM GLOBAL TECHNOLOGY OPERATIONS LLC, Detroit, MI (US); AMERICAN AXLE & MANUFACTURING, INC., Detroit, MI (US)

( * ) Notice: Subject to any disclaimer, the term of this patent is extended or adjusted under 35 U.S.C. 154(b) by 0 days.

(21) Appl. No.: 17/728,205

(22) Filed: Apr. 25, 2022

(65) Prior Publication Data
US 2023/0341050 A1 Oct. 26, 2023

(51) Int. Cl.
F16J 7/00 (2006.01)
F16C 7/02 (2006.01)

(52) U.S. Cl.
CPC ............ *F16J 7/00* (2013.01); *F16C 7/023* (2013.01)

(58) Field of Classification Search
CPC ..... F16J 7/00; F16C 7/02; F16C 7/023; F02B 75/32
See application file for complete search history.

(56) References Cited

U.S. PATENT DOCUMENTS

2017/0307005 A1* 10/2017 Ejakov .................. F16C 7/023

FOREIGN PATENT DOCUMENTS

| EP | 2908033 A1 * | 8/2015 | .............. F16C 7/023 |
| WO | WO-2016104171 A1 * | 6/2016 | .............. F01M 1/06 |

OTHER PUBLICATIONS

Machine translation of JP2016121702A, Ueno et al., published Jun. 30, 2016, obtained from https://worldwide.espacenet.com/, pp. 1-5. (Year: 2016).*

* cited by examiner

*Primary Examiner* — Grant Moubry
(74) *Attorney, Agent, or Firm* — Harness, Dickey & Pierce, P.L.C.

(57) ABSTRACT

A connecting rod includes an elongated body having a first connection end and a second connection end and an intermediate portion extending between the first connection end and the second connection end. The first connection end includes a cylindrical opening configured to receive a bushing and a link pin. The first connection end includes a first side face and a second side face each raised relative to the intermediate portion, the first side face includes a recessed slot that communicates with the cylindrical opening and an outer edge of the first side face. The slots can optionally be provided on the second side face, giving the connecting rod one or more slots on each side, which lubricate the link pin with splash oil.

20 Claims, 3 Drawing Sheets

CONNECTING ROD CATCHER SLOT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a connecting rod for an engine and more particularly to a connecting rod having a catcher slot configured to direct oil to the link pin bushing.

Variable compression engines allow a volume above a piston at top dead center to be changed depending upon different operating conditions. The ability to alter the volume at top dead center allows the engine to be altered to provide increased power at higher loads and to provide lower power at lower loads to reduce fuel consumption. The variable compression engine can use a mechanical linkage including multiple connecting rods that connect between a piston and a multi-link on the crankshaft and between the multi-link and a control shaft. The connecting rods of a variable compression engine can experience high loads at the link pin interfaces. Therefore, it is desirable to increase the lubrication to the link pin interfaces of a connecting rod.

SUMMARY

According to a first aspect, a connecting rod includes an elongated body having a first connection end and a second connection end and an intermediate portion extending between the first connection end and the second connection end. The first connection end includes a cylindrical opening configured to receive a bushing and a link pin. The first connection end includes a first side face and a second side face each raised relative to the intermediate portion, the first side face includes a recessed slot that communicates with the cylindrical opening and an outer edge of the first side face.

According to a further aspect of the present disclosure, the recessed slot includes a pair of recessed slots.

According to yet another aspect of the present disclosure, the recessed slot is U-shaped.

According to a still further aspect of the present disclosure, the recessed slot is curved.

According to a still further aspect of the present disclosure, the first connection end is a small end.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
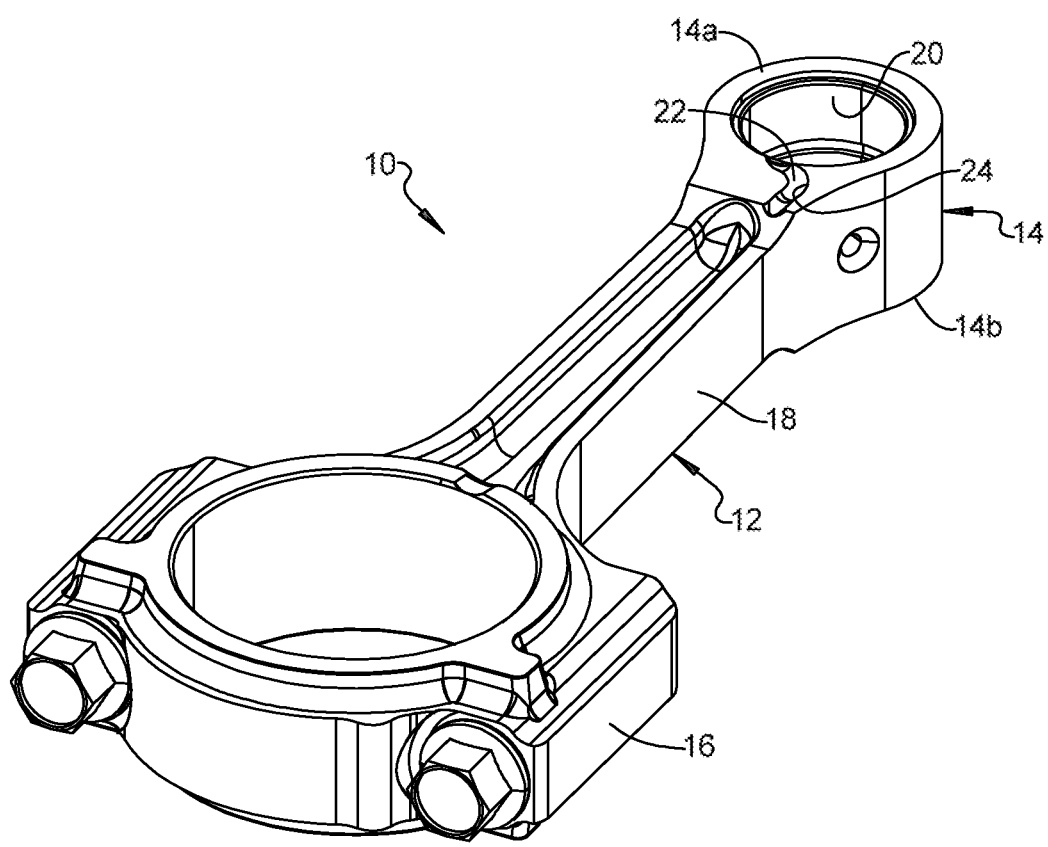
FIG. 1 is a perspective view of a connecting rod having a catcher slot according to the principles of the present disclosure.

With reference to FIG. 1, a connecting rod 10 according to the principles of the present disclosure will now be described. The connecting rod 10 includes an elongated body 12 having a first connection end 14 and a second connection end 16 and an intermediate portion 18 extending between the first connection end 14 and the second connection end 16. The intermediate portion 18 can optionally include an I-beam cross section.

The first connection end 14 is a "small end" of the connecting rod 10. The first connection end 14 includes a cylindrical opening 20 configured to receive a bushing and a link pin. As used herein, the term "small end" of a connecting rod refers to an end of a connecting rod that connects to a piston or other linkage through an un-lubricated link pin. The link pin can connect the small end of the connecting rod to a piston or other linkage member of, for example but not limited to, a variable compression engine system. The second connection end 16 of the connecting rod 10 can be a crank pin end, as shown, or can be a small end the same or similar to the first connection end 14.

The first connection end 14 includes a first side face 14a and a second side face 14b each raised relative to the intermediate portion 18. The first side face 14a includes a recessed slot 22 that communicates with the cylindrical opening 20 and an outer edge of the first side face 14a. The recessed slot 22 can be straight or curved, as illustrated in FIG. 1. The recessed slot 22 is configured to receive splash oil and can have a curved wall 24 that is configured to direct lubricant toward the bushing and link pin within the cylindrical opening 20.

Figure 2:
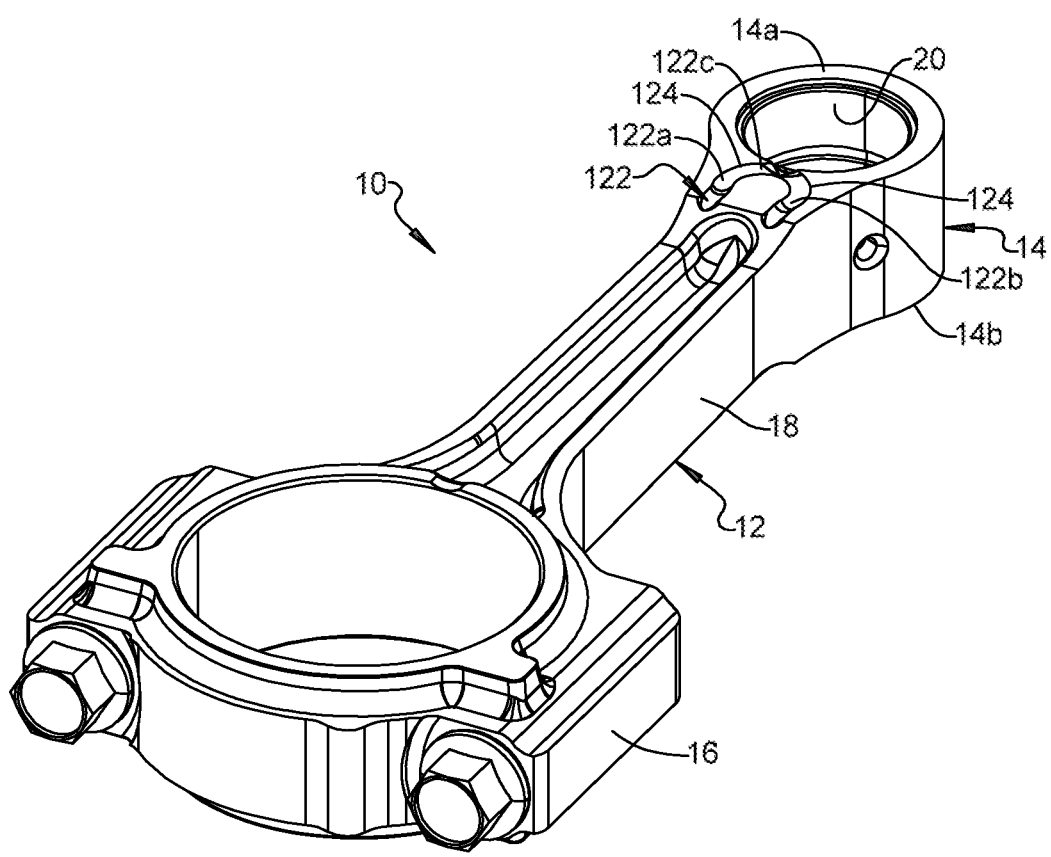
FIG. 2 is a perspective view of a connecting rod having a catcher slot according to a second embodiment of the present disclosure.

According to an alternative embodiment as shown in FIG. 2, the recessed slot 122 can be U-shaped. The U-shaped recessed slot 122 can include a pair of side legs 122a, 122b that each open to the outer edge of the first side face 14a and a bridge portion 122c connecting the pair of side legs 122a, 122b. The bridge portion 122c of the U-shaped recessed slot 122 opens to the cylindrical opening 20. The U-shaped recessed slot 122 is configured to receive splash oil and can have a curved wall 124 that is configured to direct lubricant toward the bushing and link pin within the cylindrical opening 20.

Figure 3:
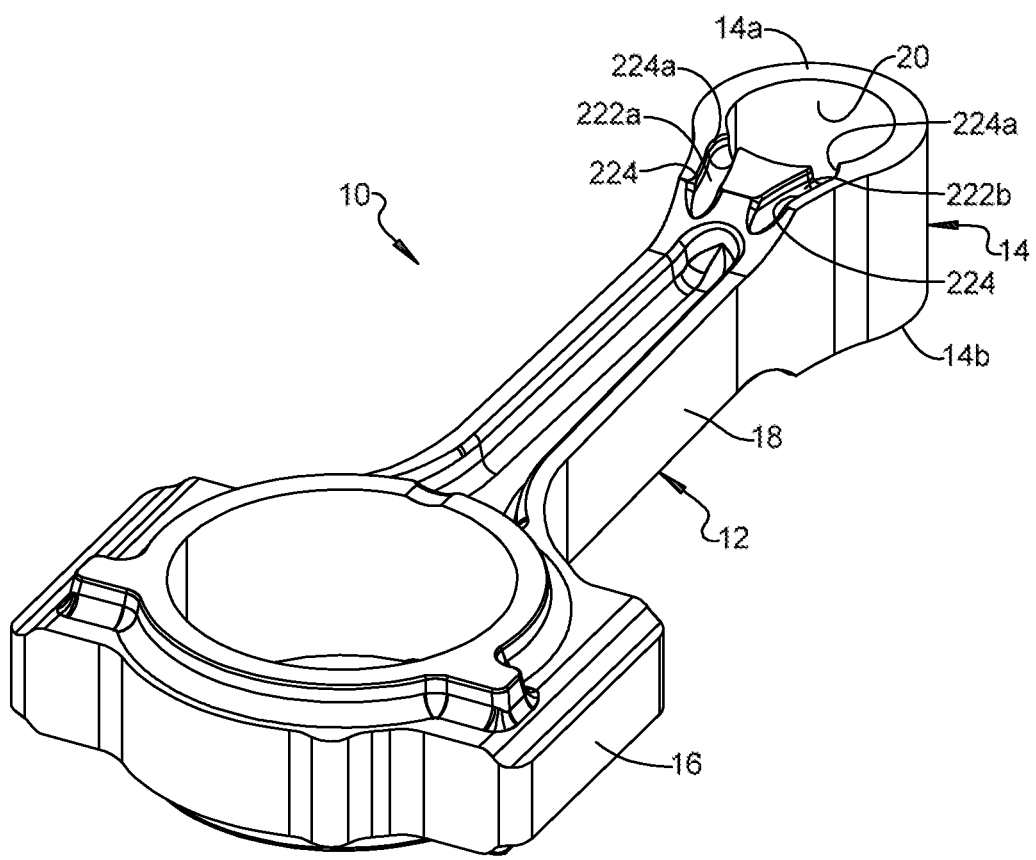
FIG. 3 is a perspective view of a connecting rod having a catcher slot according to a third embodiment of the present disclosure.

According to yet another alternative embodiment as shown in FIG. 3, the recessed slot can include a pair of twin recessed slots 222a, 222b. The pair of recessed twin recessed slots 222a, 222b can extend from the cylindrical opening 20 toward the intermediate portion 18 of the elongated body 12. The pair of twin recessed slots 222a, 222b can each include an outer wall 224 with a curled end 224a that provides a scoop-like structure that opens into the cylindrical opening.

The slots 22, 122, 222 can be formed by casting, machining, powdered metal forming or other known forming methods. The use of slots on a "small end" of a connecting rod for collecting and delivering lubricant to the bushing and link pin is new in the field of connecting rods. The slots, as disclosed, improve lubrication of the link pins of either a variable compression engine or a conventional piston pin system. The slots can reduce the mass of the connecting rod 10. The slots receive splash oil and direct the oil to the link pin interface. The slots can be used on other engine or transmission parts.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

What is claimed is:

1. A connecting rod, comprising:
   an elongated body having a first connection end and a second connection end and an intermediate portion extending between the first connection end and the second connection end;
   the first connection end including a cylindrical opening configured to receive a bushing and a link pin;
   the first connection end including a first side face and a second side face each raised relative to the intermediate portion, the first side face and the second side face each facing in a direction of a center axis of the cylindrical opening, the first side face including a recessed slot that communicates with the cylindrical opening and an outer edge of the first side face.

2. The connecting rod according to claim 1, wherein the recessed slot includes a pair of recessed slots.

3. The connecting rod according to claim 2, wherein the pair of recessed slots extend from the opening toward the intermediate portion of the elongated body.

4. The connecting rod according to claim 3, wherein the pair of recessed slots include a curled end that opens into the opening.

5. The connecting rod according to claim 1, wherein the intermediate portion of the elongated body has an I-beam cross-section.

6. The connecting rod according to claim 1, wherein the recessed slot is U-shaped.

7. The connecting rod according to claim 6, wherein the U-shaped recessed slot includes a pair of side legs that opens to the outer edge of the first side face and a bridge portion connecting the pair of side legs, the bridge portion opens to the cylindrical opening.

8. The connecting rod according to claim 1, wherein the recessed slot is curved.

9. The connecting rod according to claim 1, wherein an entirety of the first connection end is formed integral with the intermediate portion.

10. The connecting rod according to claim 1, wherein the first connection end is smaller than the second connection end.

11. The connecting rod according to claim 1, wherein the first connection end is a small end.

12. The connecting rod according to claim 1, wherein the second side face includes an additional recessed slot that communicates with the cylindrical opening and an outer edge of the second side face.

13. The connecting rod according to claim 12, wherein the additional recessed slot includes a pair of recessed slots.

14. A connecting rod, comprising:
    an elongated body having a first connection end and a second connection end and an intermediate portion extending between the first connection end and the second connection end;
    the first connection end including a cylindrical opening configured to receive a bushing and a link pin;
    the first connection end including a first side face and a second side face each raised relative to the intermediate portion, the first side face including a pair of recessed slots that each communicate with the cylindrical opening and an outer edge of the first side face.

15. The connecting rod according to claim 14, wherein the pair of recessed slots extend from the cylindrical opening toward the intermediate portion of the elongated body.

16. The connecting rod according to claim 14, wherein the pair of recessed slots include a curled end that opens into the opening.

17. The connecting rod according to claim 14, wherein the intermediate portion of the elongated body has an I-beam cross-section.

18. The connecting rod according to claim 14, wherein the first connection end is a small end.

19. The connecting rod according to claim 14, wherein the second side face includes a pair of additional recessed slots that communicate with the cylindrical opening and an outer edge of the second side face.

20. The connecting rod according to claim 19, wherein the pair of additional recessed slots extend from the cylindrical opening toward the intermediate portion of the elongated body.

* * * * *